US012556170B2

(12) United States Patent
Dimitriadis et al.

(10) Patent No.: US 12,556,170 B2
(45) Date of Patent: Feb. 17, 2026

(54) LEVERAGING AN ADAPTIVE OSCILLATOR FOR FAST FREQUENCY CHANGES

(71) Applicants: Advanced Micro Devices, Inc., Santa Clara, CA (US); ATI Technologies ULC, Markham (CA)

(72) Inventors: Sokratis Dimitriadis, Santa Clara, CA (US); Rashad Oreifej, Orlando, FL (US); Ashish Jain, Austin, TX (US); Joyce Cheuk Wai Wong, Markham (CA); Tzyy-Juin Kao, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/935,391

(22) Filed: Sep. 26, 2022

(65) Prior Publication Data

US 2024/0106423 A1    Mar. 28, 2024

(51) Int. Cl.
| | | |
|---|---|---|
| *H03K 5/00* | (2006.01) | |
| *G05F 1/46* | (2006.01) | |
| *G06F 1/08* | (2006.01) | |
| *H03K 5/159* | (2006.01) | |

(52) U.S. Cl.
CPC .......... *H03K 5/00006* (2013.01); *G05F 1/46* (2013.01); *G06F 1/08* (2013.01); *H03K 5/159* (2013.01)

(58) Field of Classification Search
CPC ...... H03K 5/00006; H03K 5/159; G05F 1/46; G06F 1/08
See application file for complete search history.

(56) References Cited

U.S. PATENT DOCUMENTS

| | | |
|---|---|---|
| 5,491,439 A | 2/1996 | Kelkar et al. |
| 6,157,247 A | 12/2000 | Abdesselem et al. |
| 8,723,571 B2 | 5/2014 | Felix |
| 9,075,608 B2 | 7/2015 | Finch et al. |

(Continued)

OTHER PUBLICATIONS

Alberto Vega, "Synthesis of variability-tolerant circuits with adaptive clocking", Universitat Politecnica de Catalunya • Barcelona Tech—UPC, Jan. 2019 (Year: 2019).

(Continued)

*Primary Examiner* — Lincoln D Donovan
*Assistant Examiner* — James G Yeaman
(74) *Attorney, Agent, or Firm* — Kowert, Hood, Munyon, Rankin & Goetzel, P.C.; Rory D. Rankin

(57) ABSTRACT

Systems, apparatuses, and methods for managing power and performance in a computing system. A system management unit detects a condition indicating a change in a power-performance state of a given computing unit is indicated. In response to detecting the indication, the system management unit is configured to initiate a change to a frequency of a clock signal generated by an adaptive oscillator by changing a voltage supplied to the adaptive oscillator. The adaptive oscillator is configured to rapidly change a frequency of the clock signal generated in response to detecting a change in a droopy supply voltage of the adaptive oscillator. The new frequency generated by the adaptive oscillator is based in part on a difference between the droopy supply voltage and a regulated supply voltage of the adaptive oscillator.

20 Claims, 9 Drawing Sheets

(56) References Cited

U.S. PATENT DOCUMENTS

| | | | |
|---|---|---|---|
| 10,382,014 B2* | 8/2019 | Wai Wong | H03L 1/02 |
| 10,425,089 B2 | 9/2019 | Kosonocky et al. | |
| 2003/0112038 A1* | 6/2003 | Naffziger | G06F 1/305 |
| | | | 327/100 |
| 2008/0298455 A1 | 12/2008 | Greenblat et al. | |
| 2012/0126847 A1 | 5/2012 | Kosonocky et al. | |
| 2015/0026531 A1 | 1/2015 | Kosonocky et al. | |
| 2015/0106642 A1 | 4/2015 | Naffziger et al. | |
| 2016/0283279 A1 | 9/2016 | Schillings | |
| 2017/0012584 A1* | 1/2017 | Lee | H03K 5/14 |
| 2018/0039317 A1 | 2/2018 | Riguer | |
| 2019/0199363 A1 | 6/2019 | Kosonocky et al. | |
| 2019/0317547 A1* | 10/2019 | Savoj | G01K 7/01 |
| 2019/0319609 A1 | 10/2019 | Wong et al. | |

OTHER PUBLICATIONS

Sherif M. Sharroush, "A voltage-controlled ring oscillator based on an FGMOS transistor", Microelectronics Journal 66 (2017) 167-186 (Year: 2017).
Abdul et al.,"Cascaded Counters", Electronics III, 1-4 (Year: 2018).
J. Cortadella, M. Lupon, A Moreno, A Roca and S.S. Sapatnekar, "Ring Oscillator Clocks and Margins," 2016 22nd IEEE International Symposium on Asynchronous Circuits and Systems (ASYNC), Porto Alegre, Brazil, 2016, pp. 19-26, doi: 10.1109/ASYNC.2016. 14. (Year: 2016).

* cited by examiner

LEVERAGING AN ADAPTIVE OSCILLATOR FOR FAST FREQUENCY CHANGES

BACKGROUND

Description of the Related Art

During the design of a computer or other processor-based system, many design factors must be considered. A successful design may require a variety of tradeoffs between power consumption, performance, thermal output, and so on. For example, the design of a computer system with an emphasis on high performance may allow for greater power consumption and thermal output. Conversely, the design of a portable computer system that is sometimes powered by a battery may emphasize reducing power consumption at the expense of some performance. Whatever the particular design goals, a computing system typically has a given amount of power available to it during operation. This power must be allocated amongst the various computing system components. For example, a portion is allocated to the central processing unit, another portion to the memory subsystem, a portion to a graphics processing unit, and so on. How the power is allocated amongst the system components may also change during operation. Additionally, various components of the system may be able to operate at multiple power performance states with each such state having a different operating frequency and operating voltage level.

While it is understood that power must be allocated within a system, how the power is allocated can significantly affect system performance. For example, if more power than needed is allocated within a system, excess power consumption results which can reduce battery life, reduce the life of system components, and otherwise. On the other hand, if insufficient power is allocated or otherwise available in the computing system, performance suffers. In addition, when a lower power performance state is indicated, achieving the new power performance state as quickly as possible is desired. Given the importance of regulating power consumption in computing systems, improved methods and mechanisms are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
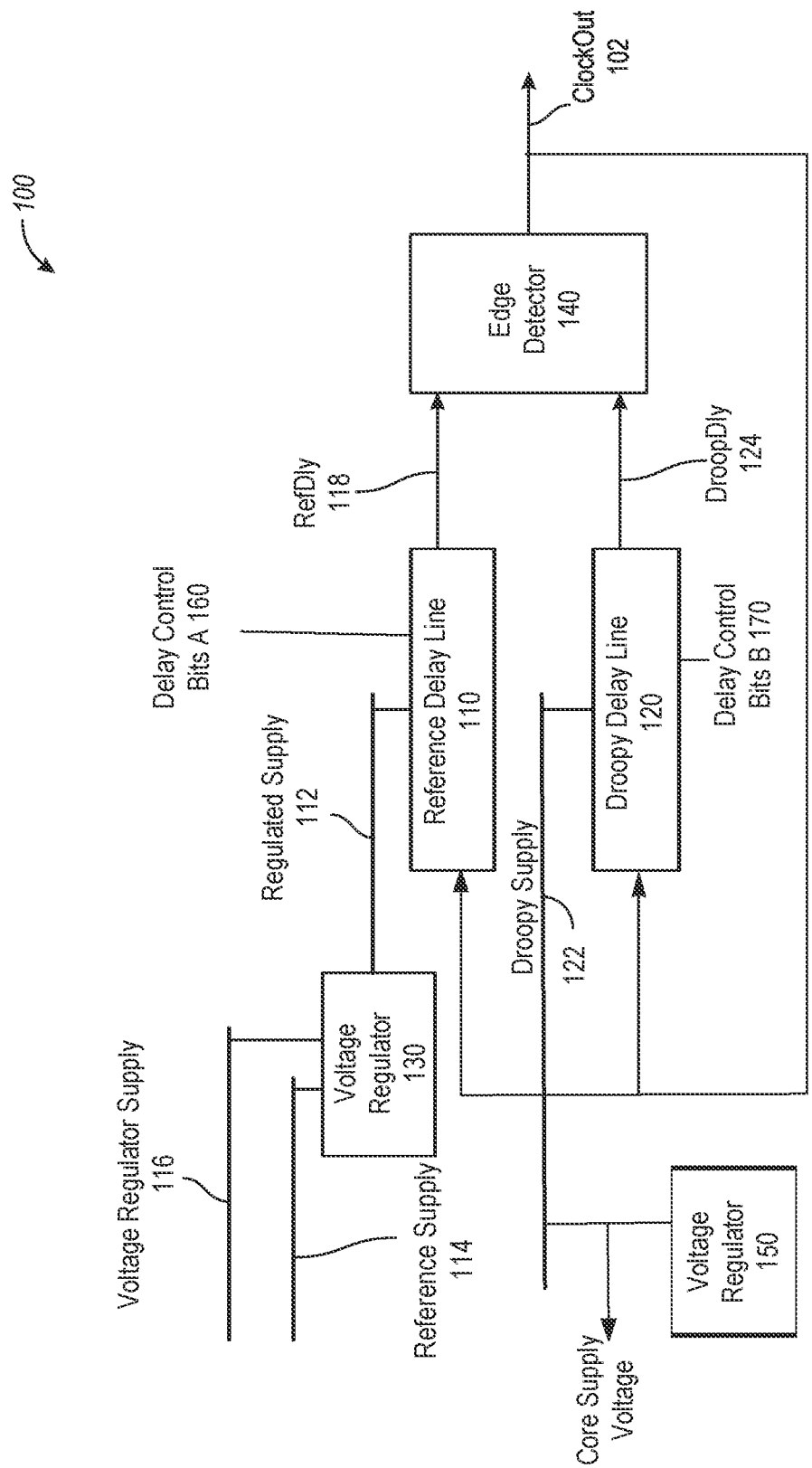
FIG. 1 is a diagram illustrating one implementation of an adaptive oscillator.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for managing power and performance in a computing system are disclosed herein. A system management circuit detects a condition indicating a change in a power-performance state of a given computing circuit is indicated. In response to detecting the indication, the system management unit is configured to initiate a change to a frequency of a clock signal generated by an adaptive oscillator by directly causing a change in a voltage supplied to the adaptive oscillator. The adaptive oscillator is configured to rapidly change a frequency of the clock signal generated in response to detecting a change in a droopy supply voltage of the adaptive oscillator. The new frequency generated by the adaptive oscillator is based in part on a difference between the droopy supply voltage and a regulated supply voltage of the adaptive oscillator.

Those skilled in the computing arts appreciate the importance of clock generation circuits. Commonly used clock generation structures include phase-locked loops (PLLs), digital frequency-locked loops (FLLs), and other clock oscillator circuits. The ability of a clock oscillator circuit to supply a stable input or system clock signal to an integrated circuit system can be affected by noise on the power supply line. Such noise can cause the power supply voltage to vary from a certain reference voltage level. Noise on the power supply line may result in fluctuations or jitter on a system clock signal line that affects the stability and operation of the sequential components of an integrated circuit.

Compensating for noise on the power supply line is typically a two-step process. In a first step, a system or circuit must first detect and indicate when there is noise on the power supply line. In a second step, in response to the indication of noise that causes a power supply droop, a signal must be generated to another circuit that will slow down the output system clock frequency as long as the noise exists. Another way a system may compensate for noise on the power supply voltage is by adding extra margin to the power supply voltage so that when there is fluctuation such as droop on the supply line, it is covered by the added margin and does not result in violation of clock circuit timing which may cause the functional timing of the chip to fail. However, the two-step process tends to be slow. For example, first, a circuit has to detect noise on a voltage supply line which can be difficult and, in some instances, may be so transient that it lasts less than a nanosecond. A nanosecond is a short period of time for detection and notification. Additionally, adding margins to power supply voltage results in the integrated circuit consuming more power which results in a lack of energy efficiency or reduced battery life of a system powered by a battery.

An improved system for responding to noise is a power supply is disclosed in U.S. Pat. No. 10,382,014, issued Aug. 13, 2019, which is assigned to the present applicant, the entirety of which is incorporated herein by reference. As disclosed therein, an adaptive oscillator circuit is described that is configured to rapidly respond to fluctuations in a supply voltage. A summary overview of the architecture is presented in FIG. 1 and FIG. 2 below.

FIG. 1 illustrates an implementation of an Adaptive Oscillator (AO) circuit 100. In various implementations, the AO functions as a delay line based oscillator. A delay line based oscillator may include, for example, without limitation, a ring oscillator, a digitally controlled oscillator, or the like. In various implementations, the AO produces an output in a manner that is similar to that of a ring oscillator.

A ring oscillator connects a chain of delay stages together in a closed loop. The output of each stage is used as input for the next one and the output from the last stage is fed back to the first stage. Each stage has a certain propagation delay for a signal to pass from the input of a given stage to the output of the same stage. Because of the delay of each stage, the circuit starts oscillating at a certain frequency. The frequency depends on the number of stages and the delay through each stage. For a ring oscillator to start oscillating, the resulting logical function of the chain of delay stages must show a logic inversion function so that when a signal travels from the input of the first stage to the output of the last stage, a signal polarity change occurs. A polarity change means logic "1" becomes logic "0" and/or logic "0" becomes logic "1". It is noted that, in the illustrative example of FIG. 1, the last stage in the ring oscillation chain is the edge detector 140. The output clock of edge detector 140 feeds back and is input simultaneously to the first stage of the AOC which include the first cells or components (not shown) in both the reference delay line 110 and the droopy delay line 120.

In FIG. 1, the AOC is illustrated as including two delay lines—reference delay line 110 and droopy delay line 120. The two delay lines may be identical to each other with respect to the number and type of internal delay components. The internal components may include, but are not limited to, buffers, inverters, or other type of non-sequential elements. The number of delay components in the delay lines may vary. For example, increasing the number of delay elements may reduce the maximum oscillation frequency of the output clock.

Each delay line is powered by a separate power supply connection. The power supply connection to each delay line determines the propagation delay, or the time it takes for a signal to propagate through each respective delay line. In one implementation, the propagation delay through the first delay line and the second delay line is approximately the same. In another implementations, the propagation delay through the first delay line and the second delay line differ.

As shown in FIG. 1, voltage regulator 130 generates a constant or steady voltage, regulated supply 112, within acceptable or nominal limits. The acceptable or nominal limits are based on a reference supply 114 that may be generated on or off chip and is set to a certain level that may be higher or lower than the core power supply voltage. As illustrated in FIG. 100, one input to the voltage regulator 130 is a voltage regulator supply 116 which is the operational power supply of voltage regulator 130. In various implementations, the voltage regulator 130 may include a filter, such as a low-pass filter, to smooth out noise transients for the reference supply 114 to obtain the regulated supply 112. In one implementation, the reference supply 114 is the core power supply. In another implementation, the core power supply may also correspond to droopy supply 122. As shown in the example, the core power supply voltage is supplied by a voltage regulator 150 which also represents the droopy supply voltage 122. Reference delay line 110 is connected to the regulated supply 112 generated from voltage detector 130 and generates a delayed signal, RefDly 118, as one input to edge detector 140.

In some implementations, the reference supply 114 is directly connected to the reference delay line 110 instead of the regulated supply 112. The regulated supply 112 provides a comparison or reference point to determine how far outside the target power supply voltage the droopy supply 122 may swing based on the noise. The target power supply voltage is the standard operating voltage of a system or circuit that excludes any variations or fluctuations.

Turning next to the power supply voltage connections of the second delay line, droopy delay line 120, droopy supply 122 connects to droopy delay line 120. The droopy supply 122 may be the input or core power supply that supplies the operating voltage for all (or some of) the components on a chip (e.g., a system-on-chip). The droopy delay line 120 generates a delayed signal, DroopDly 124, as another input to edge detector 140.

Turning now to the operation of the edge detector 140 of adaptive oscillator circuit 100, edge detector 140 receives as input two signals as shown in FIG. 1. One input signal to edge detector 140 is RefDly 118 that is output from reference delay line 110. A second input signal to edge detector 140 is DroopDly 124 that is output from droopy delay line 120. Edge detector 140 generates output clock signal 102 (ClockOut). The output clock, ClockOut 102, may be output to the system of the AOC. As shown, clockOut 102 also has a feedback path to the inputs of both reference delay line 110 and droopy delay line 120. ClockOut 102 propagates by way of the feedback path to both the reference delay line 110 and the droopy delay line 120 at the same time. It is noted that changes in polarity may also be implemented inside reference delay line 110 and the droopy delay line 120.

Edge detector 140 toggles the output of clock signal ClockOut 102 only when both of its inputs are of the same polarity. For example, when both RefDly 118 and DroopDly 124 are at the same polarity of logic zero "0" or logic one"1", the output ClockOut 102 toggles or changes polarity. A change in polarity is said to occur when a signal changes from a first defined state to a different second defined state, for example, from 0 to 1. The logical operation of edge detector 140 is shown in Table 1.

TABLE 1

| Edge Detector Logical Operation | | |
|---|---|---|
| RefDly | DroopDly | ClockOut |
| 0 | 0 | Toggle |
| 0 | 1 | No Change; Retain Current Polarity |
| 1 | 0 | No Change; Retain Current Polarity |
| 1 | 1 | Toggle |

Edge detector 140 may be implemented by one or more components that operate in accordance with the edge detector logical operation shown in Table 1. As shown in the example, the output of the edge detector 140, ClockOut 102, may be output to generate a system clock and feeds back to the input stage of reference delay line 110 and the input stage of droopy delay line 120 based on the ring oscillator architecture of the AOC. The time it takes for ClockOut 102 to propagate through reference delay line 110 and droopy delay line 120 and affect the output of edge detector 140 depends on the input power supply voltage that connects to each respective delay line. More specifically, in operation, ClockOut 102 toggles in accordance with the delayed signal that has the greater propagation delay or is the slower of the two delayed signals between RefDly 118 and DroopDly 124. Edge detector generates a ClockOut 102 that has a lower (i.e., slower) frequency when there is noise that causes droop on droopy delay line 120. In sum, frequency of the output system clock, ClockOut 102, is determined by the reference delay line 110 or the droopy delay line 120.

FIG. 1 also illustrates signals used to control the frequency of the ClockOut signal 102 generated by adaptive oscillator circuit 100. In the illustrative example, reference delay line 110 and droopy delay line 120 are identical to each other. One or more delay control bits 160 and 170 may be used to control the propagation delay through each delay line. The delay control bits may come from a controller in the same system as the adaptive oscillator circuit 100. In one implementation, the values of the delay control bits 160 and 170 may be the same. In another implementation, the values of the delay control bits 160 and 170 may be different. When the delay control bits 160 and 170 are the same, the propagation delay through the reference delay line 110 and the droopy delay line 120 is the same and the frequency of the output clock, ClockOut 102, is determined by the slower delay of the reference delay line 110 or the droopy delay line 120.

When the delay control bits 160 and 170 are different, the propagation delay through the reference delay line 110 and the droopy delay line 120 are different. However, the delay control bits 160 and 170 may be adjusted so the propagation delay of the droopy delay line 120 remains within a threshold that controls the overshoot of the adaptive oscillator circuit output clock frequency. By setting the values of the delay control bits, the frequency of the ClockOut signal 102 can be set to a desired frequency.

Figure 2:
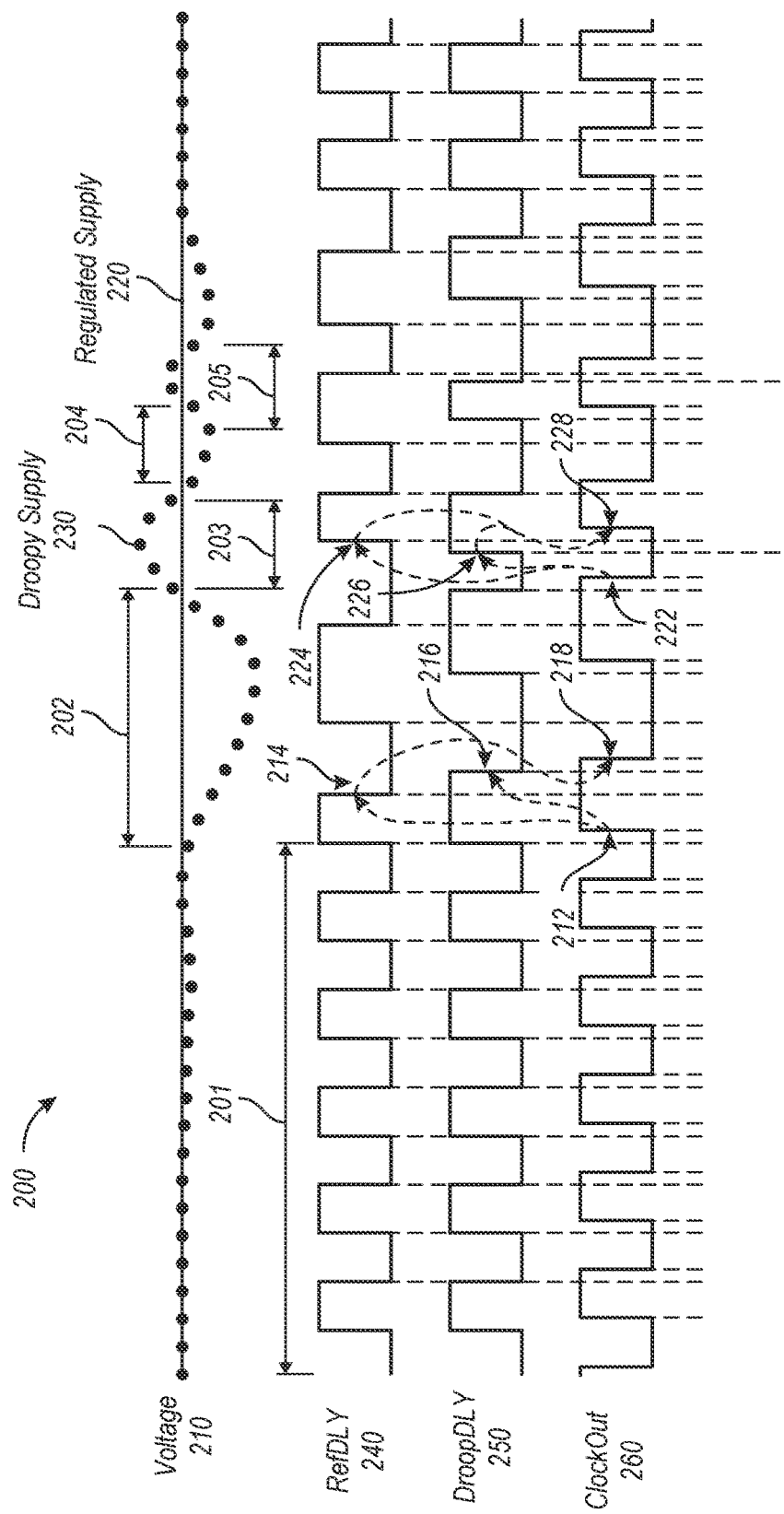
FIG. 2 illustrates operation of the adaptive oscillator of FIG. 1.

FIG. 2 provides one example of a timing diagram 200 that illustrates the operation of the adaptive oscillator circuit 100 shown in FIG. 1. As shown in the example, the upper portion of the figures shows both the droopy voltage supply voltage 230 (shown by a dotted line) in relation to the regulated supply voltage level 220 (shown by a solid line) on input voltage line 210. As can be seen, the regulated supply voltage 220 remains relatively constant at a fixed level of voltage 210. In contrast, the droopy supply voltage 230 is shown to vary over time.

As depicted, during a time period 201, the droopy supply 230 is relatively constant at the level of regulated supply 220 on voltage line 210. When regulated supply 220 and droopy supply 230 are at the same voltage level, RefDly 240 and DroopDly 250 change polarity at the same time. ClockOut 260 toggles when RefDly 240 and DroopDly 250 are of the same polarity.

However, during a time period 202 and again at a time period 204, droopy supply 230 droops or falls lower than the regulated supply 220. The droop may be caused by noise or some other circuit disturbance. The lowered voltage level of droopy supply 230 relative to the regulated supply 220 causes the propagation delay (through droopy delay line 120) of ClockOut 260 at 212 to 216 to be longer than the propagation delay (through reference delay line 110) of ClockOut 260 at 212 to 214. This may cause DroopDly 250 to toggle at a later time than RefDly 240 as depicted at 216.

Therefore, as shown at 218, ClockOut 260, will follow the change in polarity of DroopDly 250. The delay in toggling DroopDly 250 is equivalent to stretching (or lengthening of) the period of ClockOut 260.

During a time period 203 and again at time period 205, the droopy supply 230 overshoots or swings higher than the regulated supply 220. As a result, the time it takes for ClockOut 260 at 222 to propagate through droopy delay line 120 to DroopDly 250 at 226 is less than the time it takes for ClockOut 260 to propagate through reference delay line 110 to RefDly 240 at 224. Nevertheless, the period of ClockOut toggles at 228 at rate based on the slower propagation delay of RefDly 240.

In summary, in the illustrative timing example FIG. 2, the clock period and frequency of ClockOut 260 of the Adaptive Oscillator 100 depicted in FIG. 1 are determined by the delay line that has the slower propagation delay based on their respective voltage level. In an ideal operation where the voltage level of the regulated supply 220 and the droopy supply 230 are the same, the propagation time through the reference delay line and the droopy delay line are the same. When noise is present on the droopy supply 230 which causes droops relative to the regulated supply 220, the propagation time through the droopy delay line 120 is slower than that of the propagation time through the reference delay line 110. In such cases, the slower delay through droopy delay line 120 will determine the output period of ClockOut 260. When noise is present on the droopy supply 230 which causes overshoots relative to the regulated supply 220, the propagation time through the droopy delay line 120 is faster than that of the propagation time through the reference delay line 110. In such cases, the slower delay through the reference delay line 110 determines the output period of ClockOut 260.

More specifically, in operation, FIG. 2, at times 202 and 204, illustrates noise on the droopy supply 230 that may cause the droopy supply voltage level to droop below the regulated supply 220. The lower voltage may cause the time ClockOut 260 to propagate through the droopy delay line to DroopDly 250 to be longer than the time ClockOut 260 needs to propagate through the reference delay line to RefDly 240. The period of ClockOut 260 remains stretched during time 202 for as long as a droop exists on the droopy supply 230. The resulting frequency of ClockOut 260 will therefore be determined by the droopy supply 230.

In addition, FIG. 2, at times 203 and 205, illustrates noise on the droopy supply 230 that may cause the droopy supply voltage level to swing above or overshoot the regulated supply 220. As a result, the time it may take for ClockOut 260 to propagate through the droopy delay line to DroopDly 250 may be faster than the propagation time through the reference delay line to RefDly 240. In this case, the time period or frequency of the output clock, ClockOut 260 is determined by RefDly 240 which has the slower propagation delay.

As noted above in the discussion of FIG. 1, the adaptive oscillator circuit 100 is able to respond to noise in a power supply in an efficient manner by automatically slowing the frequency of the clock signal conveyed to system components when the power supply droops. As also described, the frequency of the clock signal generated by the adaptive oscillator 100 can be set to a desired operating frequency using the delay control bits 160 and/or 170. Setting the clock frequency of system components is important for both controlling system performance and controlling power consumption.

Figure 3:
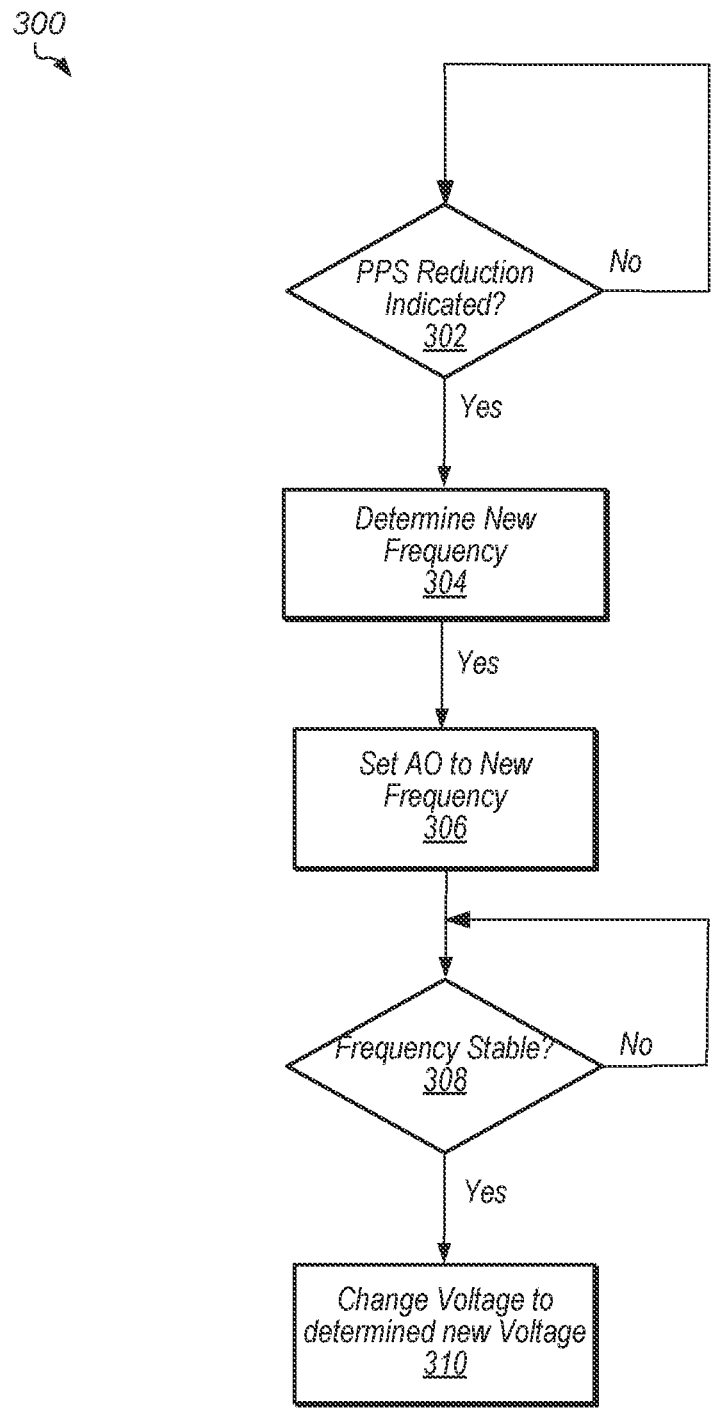
FIG. 3 illustrates one method for changing a power performance state of a computing component.

FIG. 3 illustrates one implementation of a method (300) for changing the power-performance state (PPS) of a computing system component that uses an adaptive oscillator. In this example, changing the PPS includes changing the operating frequency of the component. In this example, a PPS reduction is indicated 302. For example, a processing component may be idle or entering an idle state. In such a case, reducing power allocated to the component would be desirable. When this indication is detected, both the voltage supplied to the component will be reduced and the clock frequency supplied to the component will be reduced. When the PPS change is indicated, the new PPS is either explicitly indicated, implied, or may be inferred. Whichever the case, certain steps are followed to accomplish these changes.

In the example shown, a new target frequency and voltage corresponding to the new PPS are determined 304. Having determined the new (target) frequency (304), delay control settings for the new frequency are determined and a corresponding indication (e.g., delay control bits 160 and/or 170) is provided to the adaptive oscillator that indicates the new operating frequency that the adaptive oscillator is to generate (e.g., the frequency of the clock signal (ClockOut 102 in FIG. 1). In response, the delay lines of the adaptive oscillator are programmed to the new delay control settings for the new target frequency and the frequency of the clock signal generated by the adaptive oscillator begins to change (306). In the implementation shown, once it is determined the adaptive oscillator is generating the new frequency in a stable manner 308 (i.e., the new clock frequency is stable), the voltage is changed to reflect the new power performance state (310). When the power performance state is being reduced to a lower power performance state, the frequency generated by the adaptive oscillator is typically reduced to a lower frequency and voltage supplied to the adaptive oscillator is reduced. Conversely, when the power performance state is being increased to a higher power performance state, the frequency and voltage are increased.

Figure 4:
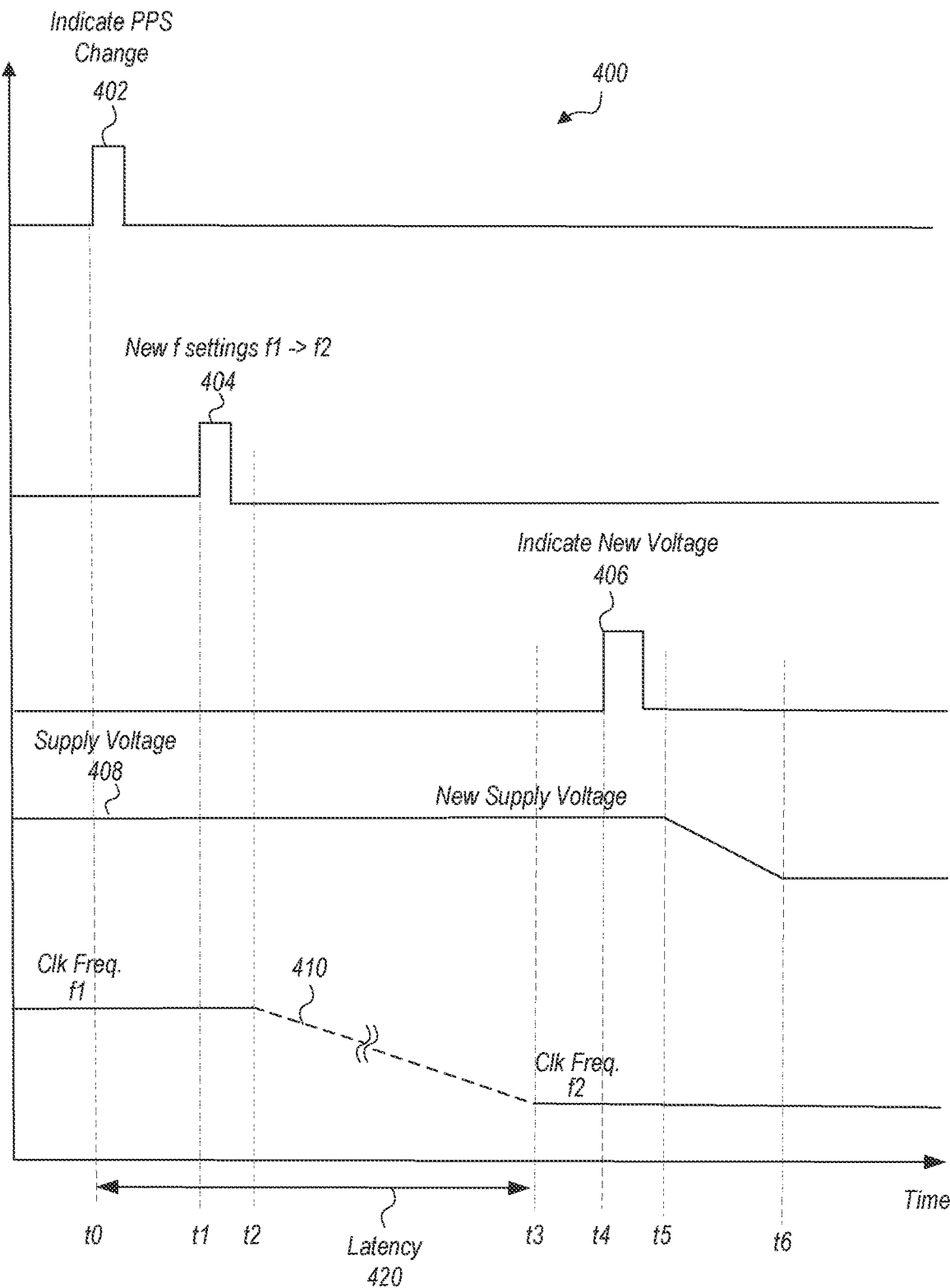
FIG. 4 illustrates one method for changing a power performance state and clock frequency of a computing component.

FIG. 4 illustration 400 one implementation for changing the PPS of a system component. As discussed above, the purpose of reducing a PPS is (typically) to reduce an operating frequency and power consumption of a component. However, as can be seen in the example of FIG. 4, there is a latency between the time the PPS reduction is requested at time t0 and the time when the new frequency and requested voltage are finally achieved at time t5. Additionally, there is a latency 420 between the time of the requested PPS change 402 and the new clock frequency f2 at time t4. In the example shown, a PPS change is indicated by the indication 402 at time t0. Indication 402 may be a signal, message, or otherwise. At the time this occurs, the clock signal 410 being generated by the adaptive oscillator has a frequency f1. Subsequent to the PPS indication 402, a new frequency to be generated by the adaptive oscillator is determined 404 (a frequency reduction from f1 to f2) at time t1. Subsequent to this indication at time t1, an indication of the new frequency is provided (e.g., by changing delay line settings), at time t2, to the adaptive oscillator and the frequency generated by the adaptive oscillator begins to decrease. After some period of time (latency 420), the clock signal generated by the adaptive oscillator becomes stable at the new frequency (f2) at time t3. Subsequent to achieving a stable clock frequency, a new voltage 406 is indicated at time t4. As shown, the supply voltage 408 begins to change at time t5 in response to the indication 406 and reaches the desired voltage at time t6. What can be seen from this approach is there is a latency between the time the PPS change is indicated (at time t0) and the time the desired frequency is attained (at time t3) and the desired voltage supplied is attained (at time t5). In order to reduce this latency, FIG. 5 illustrates a method for changing the PPS state that differs from that of FIG. 4.

Figure 5:
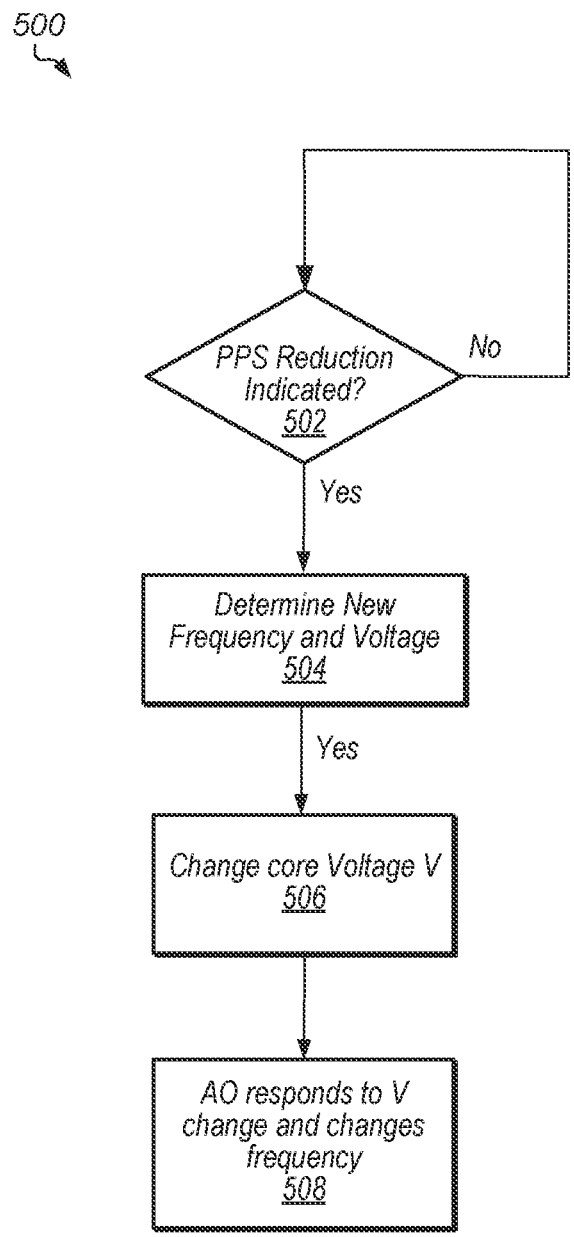
FIG. 5 illustrates one method for changing a power performance state and operating frequency of a computing component.

In the implementation illustrated in FIG. 5, an alternative method shown that leverages the fact that the adaptive oscillator (AO) is designed to rapidly respond to changes in a supply voltage. As discussed above, one of the purposes of such a design is to respond to voltage droop (e.g., due to noise) in order to protect the correct operation of circuitry. However, in this example, the voltage droop operation of the adaptive oscillator is used to cause a desired reduction in operating frequency more rapidly than described in FIG. 3. More particularly, in contrast to FIG. 3 which followed a given sequence of steps to achieve a change in PPS, the method of FIG. 5 bypasses selected steps and has a reduced latency in moving to the target frequency as a result. As shown, when a PPS reduction is indicated 502, a new voltage and frequency corresponding to the new PPS is determined 504. This can be determined based on a table lookup, calculated, or otherwise. For example, in various implementations, each PPS is associated with a corresponding supply voltage level. Higher performance states are associated with higher voltage levels and lower performance states are associated with lower voltage levels. A correspondence between such performance states and voltages is maintained (e.g., as stored data or otherwise). Additionally, each voltage level (and/or power performance state) can be associated with a corresponding operating frequency. Information (parameters) regarding such correspondences can be maintained as well. In other implementations, a formula(s) is used to determine the correspondences. Based on such information, when a new power performance state is indicated, a corresponding voltage and/or frequency are identified. In various implementations, the maintained information can be searched based on a target frequency, power performance state, or voltage, to identify the other corresponding parameters. Numerous such implementations are possible and are contemplated.

Having identified the new core voltage level, the new core voltage is then supplied to component(s) whose power performance state is being changed. This new voltage is also supplied to the adaptive oscillator (506) as the droopy supply voltage. The adaptive oscillator, which monitors the supplied voltage (the droopy supply voltage), detects the drop in voltage and interprets it as a voltage droop and reduces the frequency of the generated clock signal in response (508). However, in contrast to a voltage droop which is unintentional and undesired, this voltage droop is purposely supplied to the adaptive oscillator. Because the adaptive oscillator detects the voltage drop, it rapidly drops the frequency of the clock signal it is generating. The adaptive oscillator will continue generating this new clock frequency until the droop supply voltage is increased. In this method, delay control bits (160, 170) are not used to set a new operating frequency of the adaptive oscillator as was the case in block 306 of FIG. 3. Also, the regulated supply voltage (112) is not changed as was in block 308 of FIG. 3. Rather, changes to the core supply voltage (which is reflected by the droopy supply voltage 122) are used in order to cause the adaptive oscillator to operate at a desired/target frequency. Consequently, by eliminating those steps, it is possible to achieve the target frequency more rapidly.

Figure 6:
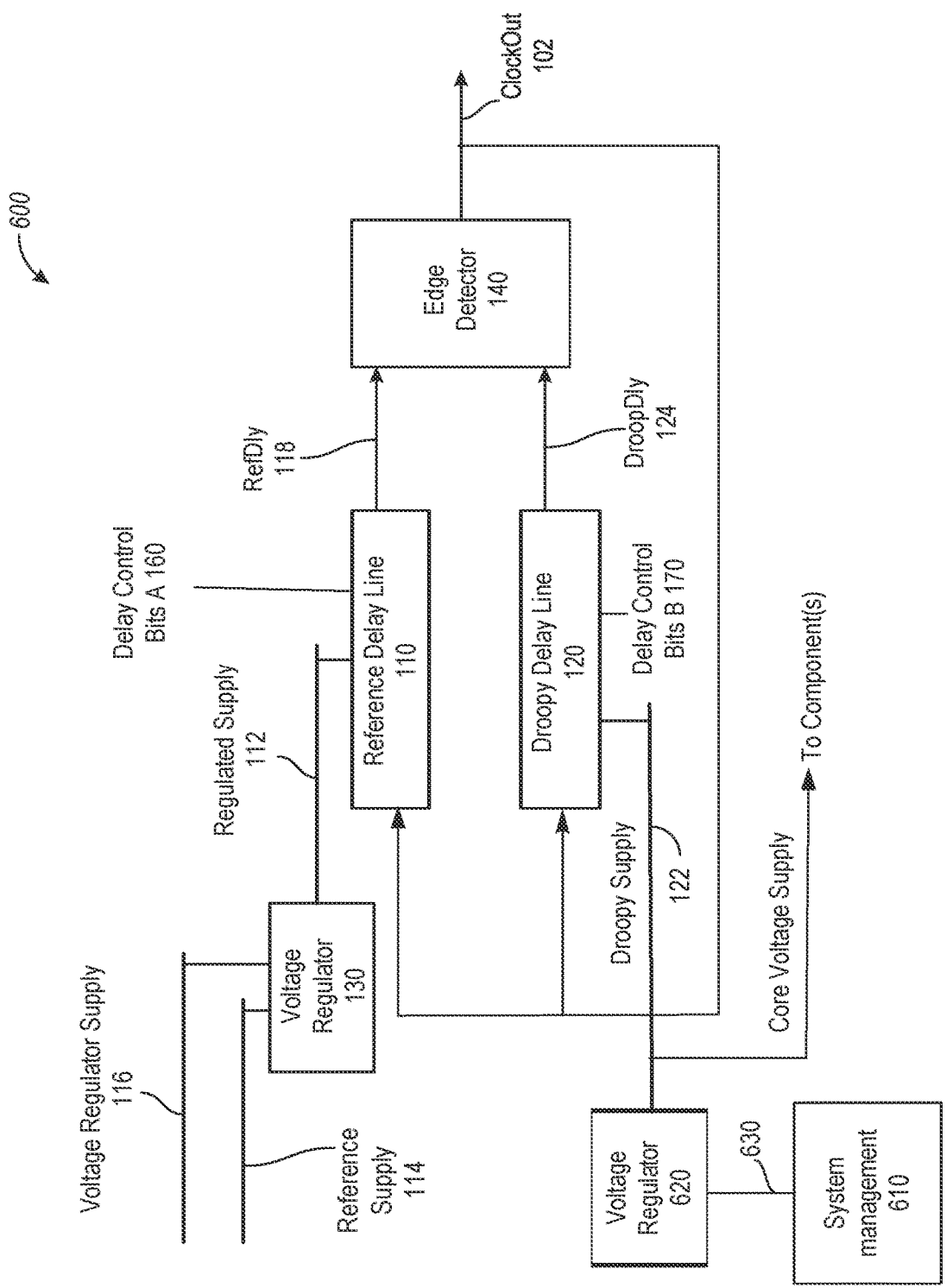
FIG. 6 is a diagram illustrating one implementation of an adaptive oscillator.

FIG. 6 illustrates one implementation of an adaptive oscillator 600 that is configured to operate as described in FIG. 5. In the example shown, like elements of FIG. 1 are similarly numbered. Also shown, is a voltage regulator 620 configured to provide droopy supply 122. A system management unit 610 is also shown. System management unit 610 is configured to manage power consumption in a system including the adaptive oscillator 600. For example, system management unit 610 is configured to monitor components of a system and change the power performance states of various components in the system. In the example shown, the system management unit 610 is configured to convey indications 630 related to determined power performance state changes to the voltage regulator 620.

As one example, in one implementation the adaptive oscillator 600 is configured to generate a clock signal 102 for a graphics processing unit (not shown). In response to the graphics processing unit (GPU) entering an idle state, system management unit 610 detects the idle state and begins a process to reduce the clock signal frequency supplied to the graphics processing unit (or some component of the GPU). A new frequency (corresponding to a new PPS) is determined. Additionally, a new voltage for the adaptive oscillator is determined. As noted above, this can be determined based on a table lookup, calculated, or otherwise. An indication 630 is then conveyed to the voltage regulator 620 to cause it to generate a new droopy supply voltage 122. As described in relation to FIG. 1, the adaptive oscillator 600 detects a difference between the regulated supply 112 and the droopy supply 122. In response, the frequency of the clockOut signal 102 changes to reflect this difference. In this example, the clock signal 102 rapidly drops to a new frequency that corresponds to the droopy supply voltage supplied by the voltage regulator 620. In various implementations, the droopy supply voltage is also the supply voltage supplied to the component(s) whose power performance state is being changed. In this manner, the operating frequency and power consumption of the component(s) are rapidly changed to reflect the desired states.

In various implementations, the frequency settings of the adaptive oscillator are fixed and do not change. For example, in one implementation, regulated supply 112 is set to (fixed at) a voltage that will support the maximum desired voltage of the adaptive oscillator 600. In order to operate at the maximum frequency, the droopy supply voltage 122 is set to be equal to that of the regulated supply. In such a case, no difference in voltage is detected and the adaptive oscillator 600 operates according to the indicated voltage at the maximum frequency. When the supplied droopy voltage is purposely lowered, the frequency of the clock signal 102 is likewise lowered. It is noted that while the supplied droopy voltage is lowered, the regulated supply voltage 112 remains unchanged such that a difference between the two voltages in maintained. By maintaining this difference in voltages, the lower frequency will continue to be generated. In other implementations, the adaptive oscillator retains delay control bits (160, 170) and is configured to directly change the supply voltage of the adaptive oscillator when operating in a given mode. Various such implementations are possible and are contemplated.

It is noted that while the discussion herein generally describes rapid reductions in the operating frequency of the adaptive oscillator, the adaptive oscillator can be used to achieve rapid increases in frequency as well. For example, when the adaptive oscillator 600 is operating at a reduced frequency due to the droopy voltage 122 being lower than the regulated supply voltage 112, a rapid increase in operating frequency can be achieved by directly increasing the droopy supply voltage 122. In response to detecting a change in the difference between the regulated supply voltage 112 and the droopy delay voltage 122, the ClockOut signal 102 rapidly increases in frequency due to the detected decrease in difference between the voltages.

Figure 7:
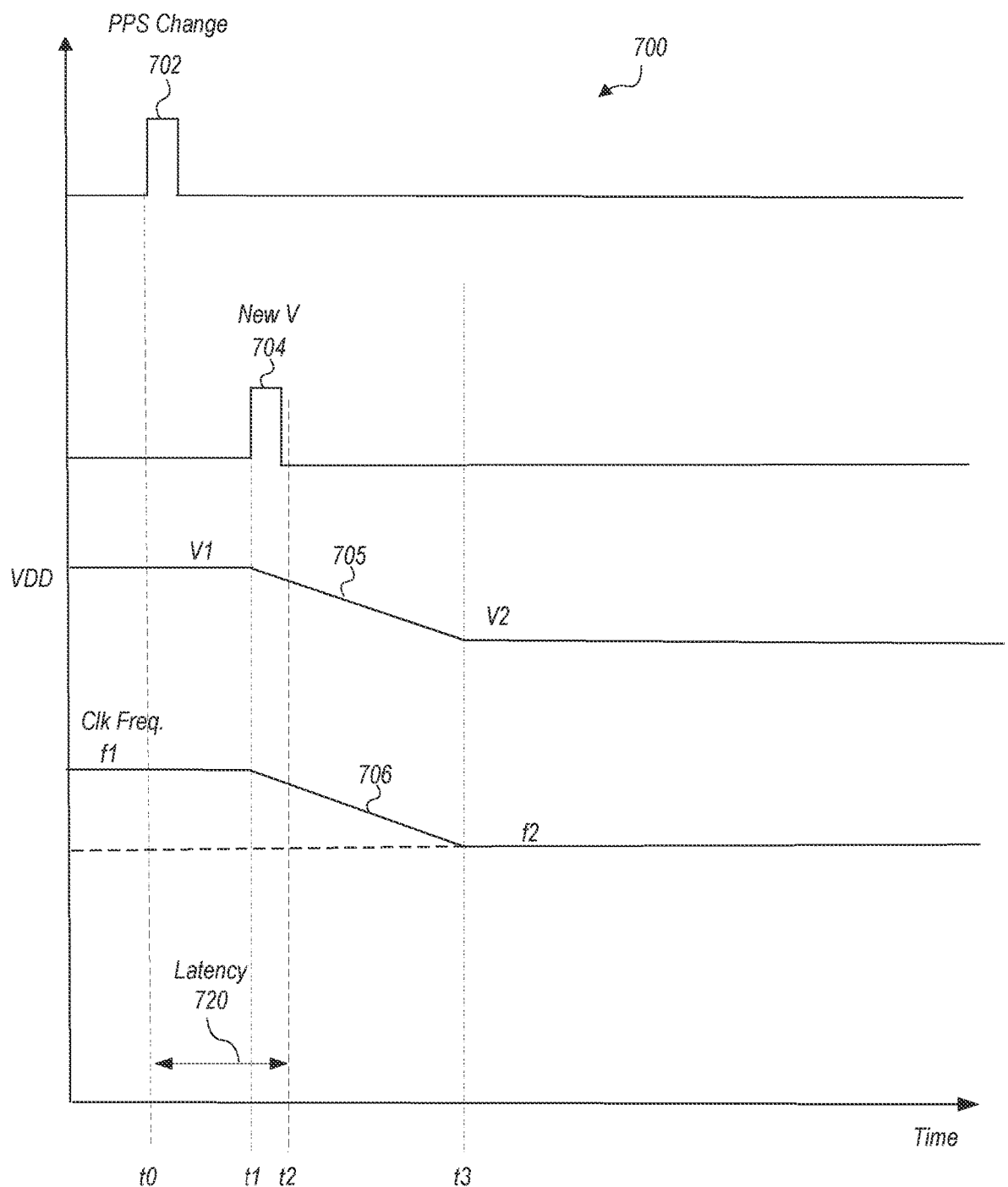
FIG. 7 illustrates a change in operating frequency of the adaptive oscillator of FIG. 6.

FIG. 7 illustrates the above described approach in which the droopy supply voltage is directly changed in order to cause a change in output frequency. In the example 700 of FIG. 7, a PPS reduction 702 is indicated at time t0. In response, a new voltage V 704 is indicated to the adaptive oscillator at time t1. In particular, a new voltage is supplied for the droop supply (e.g., 122 in FIG. 6). In response to detecting the drop in voltage V 705 at time t1, the clock signal frequency 706 generated by the adaptive oscillator (e.g., ClockOut 102 in FIG. 6) begins to drop. In the example shown, the frequency 706 drop generally reflects (i.e., is generally proportional to) the drop in voltage 705. However, in various implementations, the adaptive oscillator is configured to undershoot the target voltage f2 such that it falls lower than the target voltage before achieving the desired frequency. In other implementations, the rapid fall in frequency falls to a level that is nearer the target frequency f2 than illustrated. In the example shown, the clock frequency rapidly falls in response to the detected change in the voltage and reaches the target frequency at a time t2. Subsequently, the clock frequency stabilizes at the target frequency f2 at time t3. As can be seen in the example of FIG. 7 the latency 720 from the time of the indicated PPS change 702 at time t0 to the time the clock frequency reaches (or falls below) that target frequency f2 is relatively short to the latency 420 that was illustrated in FIG. 4. Consequently, components clocked by the clock signal rapidly begin operating at a lower frequency and power consumption is more rapidly decreased than was shown in FIG. 4.

Figure 8:
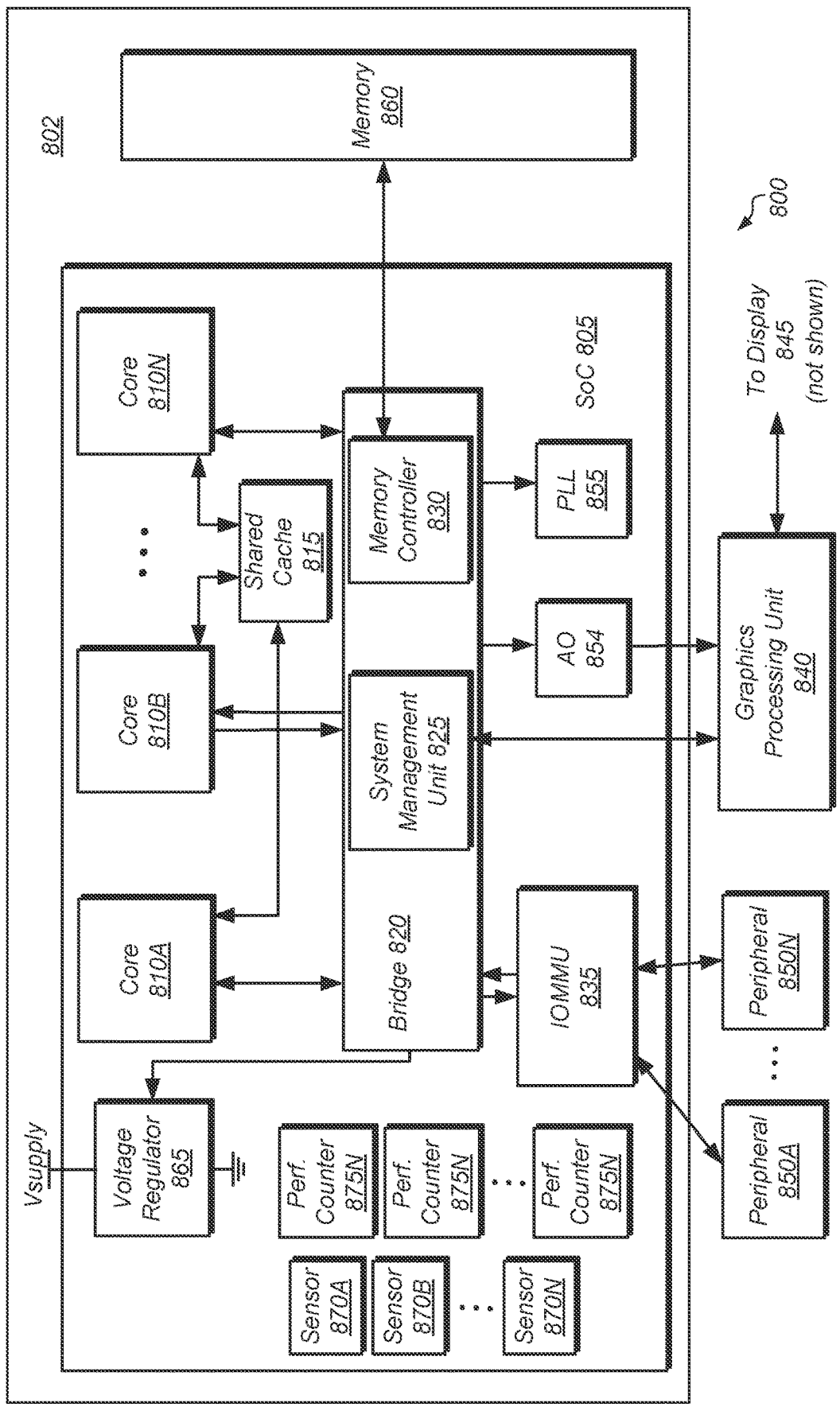
FIG. 8 is a block diagram showing a computing system.

Referring now to FIG. 8, a diagram of one implementation of a computing system 800 is shown. In this implementation, the illustrated computing system 800 includes system on chip (SoC) 805 coupled to memory 860. However, embodiments in which one or more of the illustrated components of the SoC 805 are not integrated onto a single chip are possible and are contemplated. In some implementations, SoC 805 includes a plurality of processor cores 810A-N and GPU 840. In the illustrated implementation, the SoC 805, Memory 860, and other components (not shown) are part of a system board 802, and one or more of the peripherals 850A-850N and GPU 840 are discrete entities (e.g., daughter boards, etc.) that are coupled to the system board 802. In other implementations, GPU 840 and/or one or more of Peripherals 850 may be permanently mounted on board 802 or otherwise integrated into SoC 805. It is noted that processor cores 810A-N can also be referred to as processing circuits or processors. Processor cores 810A-N and GPU 840 are configured to execute instructions of one or more instruction set architectures (ISAs), which can include operating system instructions and user application instructions. These instructions include memory access instructions which can be translated and/or decoded into memory access requests or memory access operations targeting memory 860.

In another implementation, SoC 805 includes a single processor core 810. In multi-core implementations, processor cores 810 can be identical to each other (i.e., symmetrical multi-core), or one or more cores can be different from others (i.e., asymmetric multi-core). Each processor core 810 includes one or more execution circuits, cache memories, schedulers, branch prediction circuits, and so forth. Furthermore, each of processor cores 810 is configured to assert requests for access to memory 860, which functions as main memory for computing system 800. Such requests include read requests, and/or write requests, and are initially received from a respective processor core 810 by bridge 820. Each processor core 810 can also include a queue or buffer that holds in-flight instructions that have not yet completed execution. This queue can be referred to herein as an "instruction queue." Some of the instructions in a processor core 810 can still be waiting for their operands to become available, while other instructions can be waiting for an available arithmetic logic circuit (ALU). The instructions which are waiting on an available ALU can be referred to as pending ready instructions. In one implementation, each processor core 810 is configured to track the number of pending ready instructions.

Input/output memory management circuit (IOMMU) 835 is coupled to bridge 820 in the implementation shown. In one implementation, bridge 820 functions as a northbridge device and IOMMU 835 functions as a southbridge device in computing system 800. In other implementations, bridge 820 can be a fabric, switch, bridge, any combination of these components, or another component. A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) can be coupled to IOMMU 835. Various types of peripheral devices 850A-N can be coupled to some or all of the peripheral buses. Such peripheral devices 850A-N include (but are not limited to) keyboards, mice, printers, scanners, joysticks or other types of game controllers, media recording devices, external storage devices, network interface cards, and so forth. At least some of the peripheral devices 850A-N that are coupled to IOMMU 835 via a corresponding peripheral bus can assert memory access requests using direct memory access (DMA). These requests (which can include read and write requests) are conveyed to bridge 820 via IOMMU 835.

In some implementations, SoC 805 includes a graphics processing unit (GPU) 840 configured to be coupled to display 845 (not shown) of computing system 800. In some implementations, GPU 840 is an integrated circuit that is separate and distinct from SoC 805. GPU 840 performs various video processing functions and provides the processed information to display 845 for output as visual information. GPU 840 can also be configured to perform other types of tasks scheduled to GPU 840 by an application scheduler. GPU 840 includes a number 'N' of compute circuits for executing tasks of various applications or processes, with 'N' a positive integer. The 'N' compute circuits of GPU 840 may also be referred to as "processing circuits". Each compute circuit of GPU 840 is configured to assert requests for access to memory 860.

In one implementation, memory controller 830 is integrated into bridge 820. In other implementations, memory controller 830 is separate from bridge 820. Memory controller 830 receives memory requests conveyed from bridge 820. Data accessed from memory 860 responsive to a read request is conveyed by memory controller 830 to the requesting agent via bridge 820. Responsive to a write request, memory controller 830 receives both the request and the data to be written from the requesting agent via bridge 820. If multiple memory access requests are pending at a given time, memory controller 830 arbitrates between these requests. For example, memory controller 830 can give priority to critical requests while delaying non-critical requests when the power budget allocated to memory controller 830 restricts the total number of requests that can be performed to memory 860.

In some implementations, memory 860 includes a plurality of memory modules. Each of the memory modules includes one or more memory devices (e.g., memory chips) mounted thereon. In some implementations, memory 860 includes one or more memory devices mounted on a motherboard or other carrier upon which SoC 805 is also mounted. In some implementations, at least a portion of memory 860 is implemented on the die of SoC 805 itself. Implementations having a combination of the aforementioned implementations are also possible and contemplated. In one implementation, memory 860 is used to implement a random access memory (RAM) for use with SoC 805 during operation. The RAM implemented can be static RAM (SRAM) or dynamic RAM (DRAM). The type of DRAM that is used to implement memory 860 includes (but are not limited to) double data rate (DDR) DRAM, DDR2 DRAM, DDR3 DRAM, and so forth.

Although not explicitly shown in FIG. 8, SoC 805 can also include one or more cache memories that are internal to the processor cores 810. For example, each of the processor cores 810 can include an L1 data cache and an L1 instruction cache. In some implementations, SoC 805 includes a shared cache 815 that is shared by the processor cores 810. In some implementations, shared cache 815 is a level two (L2) cache. In some implementations, each of processor cores 810 has an L2 cache implemented therein, and thus shared cache 815 is a level three (L3) cache. Cache 815 can be part of a cache subsystem including a cache controller.

In one implementation, system management circuit 825 is integrated into bridge 820. In other implementations, system management circuit 825 can be separate from bridge 820 and/or system management circuit 825 can be implemented as multiple, separate components in multiple locations of SoC 805. System management circuit 825 is configured to manage the power states of the various processing circuits of SoC 805. System management circuit 825 may also be referred to as a power management circuitry. In one implementation, system management circuit 825 uses dynamic voltage and frequency scaling (DVFS) to change the frequency and/or voltage of a processing circuit to limit the processing circuit's power consumption to a chosen power allocation.

SoC 805 includes multiple temperature sensors 870A-N, which are representative of any number of temperature sensors. It should be understood that while sensors 870A-N are shown on the left-side of the block diagram of SoC 805, sensors 870A-N can be spread throughout the SoC 805 and/or can be located next to the major components of SoC 805 in the actual implementation of SoC 805. In one implementation, there is a sensor 870A-N for each core 810A-N, compute circuit of GPU 840, and other major components. In this implementation, each sensor 870A-N tracks the temperature of a corresponding component. In another implementation, there is a sensor 870A-N for different geographical regions of SoC 805. In this implementation, sensors 870A-N are spread throughout SoC 805 and located so as to track the temperatures in different areas of SoC 805 to monitor whether there are any hot spots in SoC 805. In other implementations, other schemes for positioning the sensors 870A-N within SoC 805 are possible and are contemplated.

SoC 805 also includes multiple performance counters 875A-N, which are representative of any number and type of performance counters. It should be understood that while performance counters 875A-N are shown on the left-side of the block diagram of SoC 805, performance counters 875A-N can be spread throughout the SoC 805 and/or can be located within the major components of SoC 805 in the actual implementation of SoC 805. For example, in one implementation, each core 810A-N includes one or more performance counters 875A-N, memory controller 830 includes one or more performance counters 875A-N, GPU 840 includes one or more performance counters 875A-N, and other performance counters 875A-N are utilized to monitor the performance of other components. Performance counters 875A-N can track a variety of different performance metrics, including the instruction execution rate of cores 810A-N and GPU 840, consumed memory bandwidth, row buffer hit rate, cache hit rates of various caches (e.g., instruction cache, data cache), and/or other metrics.

In one implementation, SoC 805 includes an adaptive oscillator (AO) circuit 854 coupled to receive a system clock signal. Adaptive oscillator circuit 855 is configured to generate and distribute corresponding clock signals to one or more components in the system 800 (e.g., processor cores 810, GPU 840, and to other components of SoC 805). In one implementation, the clock signals received by each of processor cores 810 are independent of one another. Furthermore, an adaptive oscillator circuit 854 in this implementation is configured to individually control and alter the frequency of each of the clock signals provided to respective ones of processor cores 810, and graphics processing unit 840, independently of one another. The frequency of the clock signal received by any given one of processor cores 810 can be increased or decreased in accordance with power states assigned by system management circuit 825. The various frequencies at which clock signals are output from PLL circuit 855 correspond to different operating points for each of processor cores 810. Accordingly, a change of operating point for a particular one of processor cores 810 is put into effect by changing the frequency of its respectively received clock signal.

An operating point for the purposes of this disclosure can be defined as a clock frequency, and can also include an operating voltage (e.g., supply voltage provided to a functional circuit). Increasing an operating point for a given functional circuit can be defined as increasing the frequency of a clock signal provided to that circuit and can also include increasing its operating voltage. Similarly, decreasing an operating point for a given functional circuit can be defined as decreasing the clock frequency, and can also include decreasing the operating voltage. Limiting an operating point can be defined as limiting the clock frequency and/or operating voltage to specified maximum values for particular set of conditions (but not necessarily maximum limits for all conditions). Thus, when an operating point is limited for a particular processing circuit, it can operate at a clock frequency and operating voltage up to the specified values for a current set of conditions, but can also operate at clock frequency and operating voltage values that are less than the specified values.

In the case where changing the respective operating points of one or more processor cores 810 includes changing of one or more respective clock frequencies, system management circuit 825 changes the state of digital signals provided to an adaptive oscillator circuit 854. Responsive to the change in these signals, an adaptive oscillator circuit 854 changes the clock frequency of the affected processing core(s) 810 and/or graphics processing unit 840. Additionally, system management circuit 825 can also cause an adaptive oscillator circuit 854 to inhibit a respective clock signal from being provided to a corresponding one of processor cores 810.

In the implementation shown, SoC 805 also includes voltage regulator 865. In other implementations, voltage regulator 865 can be implemented separately from SoC 805. Voltage regulator 865 provides a supply voltage to each of processor cores 810 and to other components of SoC 805. In some implementations, voltage regulator 865 provides a supply voltage that is variable according to a particular operating point. In some implementations, each of processor cores 810 shares a voltage plane. Thus, each processing core 810 in such an implementation operates at the same voltage as the other ones of processor cores 810. In another implementation, voltage planes are not shared, and thus the supply voltage received by each processing core 810 is set and adjusted independently of the respective supply voltages received by other ones of processor cores 810. Thus, operating point adjustments that include adjustments of a supply voltage can be selectively applied to each processing core 810 independently of the others in implementations having non-shared voltage planes. In the case where changing the operating point includes changing an operating voltage for one or more processor cores 810, system management circuit 825 changes the state of digital signals provided to voltage regulator 865. Responsive to the change in the signals, voltage regulator 865 adjusts the supply voltage provided to the affected ones of processor cores 810. In instances when power is to be removed from (i.e., gated) one of processor cores 810, system management circuit 825 sets the state of corresponding ones of the signals to cause voltage regulator 865 to provide no power to the affected processing core 810.

In various implementations, computing system 800 can be a computer, laptop, mobile device, server, web server, cloud computing server, storage system, or any of various other types of computing systems or devices. It is noted that the number of components of computing system 800 and/or SoC 805 can vary from implementation to implementation. There can be more or fewer of each component/subcomponent than the number shown in FIG. 8. It is also noted that computing system 800 and/or SoC 805 can include other components not shown in FIG. 8. Additionally, in other implementations, computing system 800 and SoC 805 can be structured in other ways than shown in FIG. 8. In some implementations, SOC 805 also includes a PLL circuit 855 configured to generate one or more clock signals.

Figure 9:
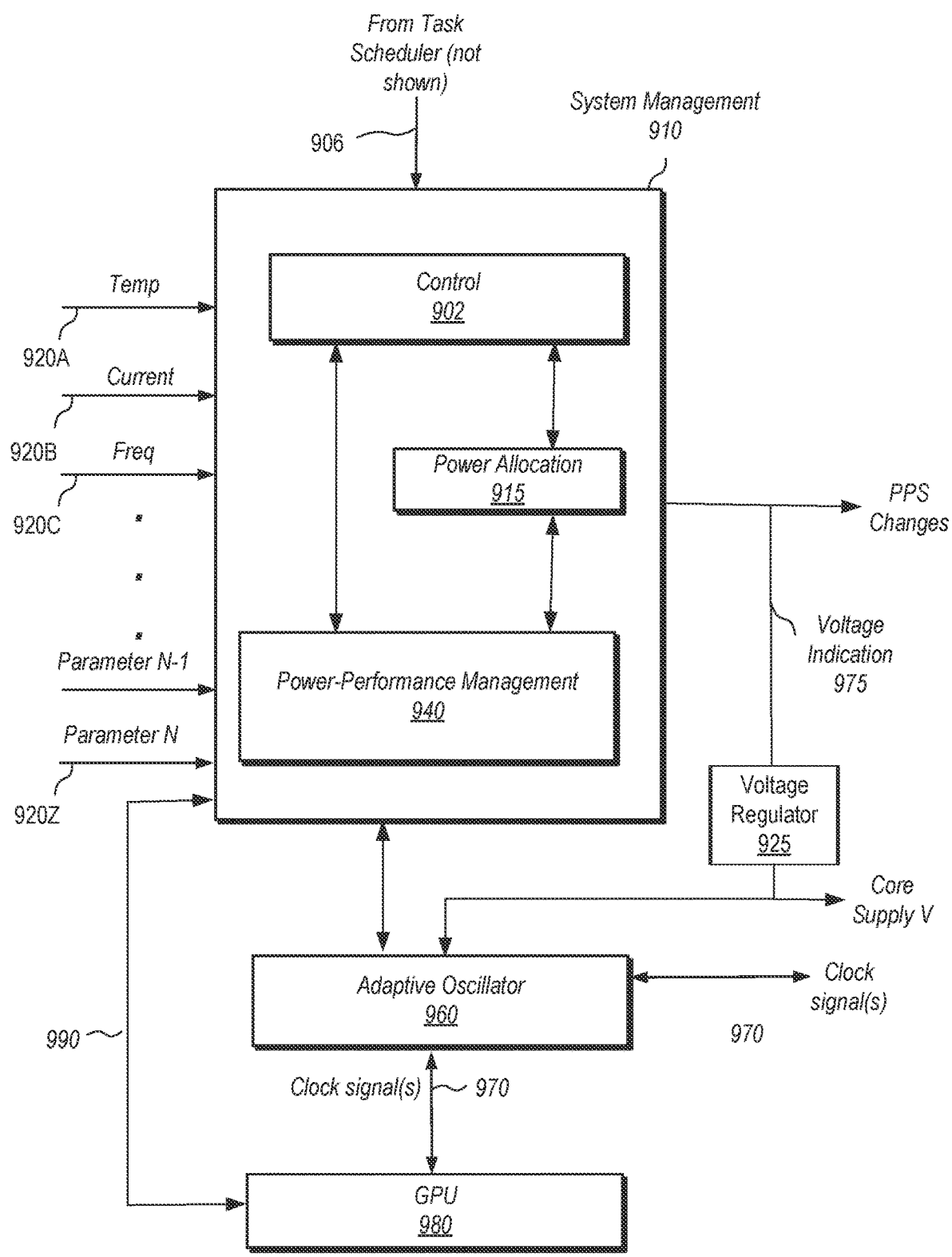
FIG. 9 is a block diagram showing a system management unit coupled to an adaptive oscillator.

FIG. 9 illustrates a system management circuitry 910 coupled to an adaptive oscillator 960, voltage regulator 925, and graphics processing unit (GPU) 980. System management circuitry includes a control circuit 902, power allocation circuit 915, and power/performance management circuit 940. System management circuit 910 is also shown as being configured to receive any number of various system parameters, shown as 920A-720Z, that correspond to conditions, operations, or states of the system. In the example shown, the parameters are shown to include operating temperature 920A of a given circuit(s), current drawn by given circuit(s) 920B, and operating frequency of a given circuit(s). Other parameters are possible and are contemplated. In various implementations, the one or more of the parameters 920 are reported from other circuits or parts of a system (e.g., based on sensors, performance counters, other event/activity detection, or otherwise). In some implementations, one or more parameters are tracked within the system management circuit 910. For example, system management circuit 910 may track current power-performance states (PPS) of components within the system, duration(s) of power-performance state, previously reported parameters, and so on. In addition, system management circuit 910 is configured to receive task related information 906 from a task scheduler.

In various implementations, system management circuit 910 provides indication(s) of PPS changes to components in the system. Adaptive oscillator 960, as discussed above, is configured to generate clock frequencies 970 for use by various components in the system, including graphics processing unit (GPU) 980. As discussed above, when a reduced PPS is indicated, the system management circuit 910 may cause a voltage supplied to various components to decrease. In some implementations, the system management circuit 910 does not provide a new frequency code or indication (e.g., via delay bits 160, 170 of FIG. 1) to the adaptive oscillator 960 such as that discussed in relation to FIG. 1. Rather, when a PPS decrease is indicated, the droop detection/mitigation functionality of the adaptive oscillator 960 is used to adjust the frequency it provides to the component whose PPS is decreased. In response to detecting such a decrease, adaptive oscillator 960 causes the frequency of the clock signal it generates to drop. For example, when a PPS change is indicated for the GPU 980, a signal(s) 975 is conveyed to voltage regulator 925 that changes the core supply voltage and droopy supply voltage supplied to the adaptive oscillator 960. Core supply voltage is the supply voltage supplied to various components in the system. In response, the adaptive oscillator 960 detects the change as described above and changes the frequency of the clock signal(s) 970 generated by the adaptive oscillator 960. In the example shown, a reduced activity level (e.g., an idle state) of the GPU 980 is detected (e.g., via signals/parameters 990 communicated between the GPU 980 and system management circuitry 910). In response, system management 910 identifies or otherwise indicates a reduced PPS for the GPU 980 and conveys the reduced voltage indication 975 to the voltage regulator 925. Voltage regulator 925 reduces the droopy supply voltage of the adaptive oscillator which causes a reduction in the clock signal frequency 970 supplied to the GPU 980. Conversely, if an increased PPS is indicated (e.g., due to an increased activity level or predicted increase in activity level), the signal 975 indicates a higher voltage to the voltage regulator 925 which increases the droopy supply voltage of the adaptive oscillator 960. This increases the frequency of the clock signal 970 conveyed to the GPU 980.

In some implementations, control circuit 902 is configured to determine how power is allocated in the computing system. In one scenario, in response to detecting a particular condition, the control circuit 902 determines a power budget allocation for various circuits within the computing system. In some implementations, system management circuit 902 provides information to one or both of power allocation circuit 915 and power-performance management circuit 940 for use in making power allocation decisions. Various such implementations and combinations are possible and are contemplated. In one scenario, the above-mentioned condition is a condition which requires a reduction in power consumption of the computing system (or some component(s) of the computing system). This condition may occur as a result of the system reaching a maximum allowed or allocated power. Alternatively, this condition may occur as a result of a thermal condition (e.g., a maximum operating temperature has been reached). In response to detecting the condition, control circuit 902 evaluates a variety of parameters including one or more of the currently running task(s), types of tasks, phases of given tasks, and so on.

In another scenario this condition may be enforced intentionally by some policy/mechanism implemented by the combined hardware and system software/firmware in an attempt to reach a desired software-dependent optimal operational point of the power performance setting. In various such implementations, certain attributes of the executing software application are tracked on the hardware as the software application is executing (at runtime) and are used to when making decisions taken at each point in time. One such example is the program instruction execution stream. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   an adaptive oscillator configured to generate a clock signal, for use by at least one component of a plurality of components of the system, based at least in part on a voltage level of a supply voltage supplied to the adaptive oscillator; and
   power management circuitry configured to initiate a change in a power performance state of the component by changing the voltage level of the supply voltage supplied to the adaptive oscillator, based at least in part on system parameters of the plurality of components.

2. The system as recited in claim 1, wherein the adaptive oscillator comprises a regulated supply voltage and a droopy supply voltage and the power management circuitry is configured to change a frequency of the clock signal to a target frequency by changing a voltage level of the droopy supply voltage.

3. The system as recited in claim 2, wherein the frequency of the clock signal is based at least in part on a difference between the regulated supply voltage and the droopy supply voltage.

4. The system as recited in claim 2, wherein the regulated supply voltage is fixed.

5. The system as recited in claim 2, wherein the power management circuitry is configured to change the voltage level of the droopy supply voltage supplied to both the adaptive oscillator and the the at least one component to a level corresponding to a power performance state of the at least one component.

6. The system as recited in claim 2, wherein in response to detecting a reduction in the droopy supply voltage, the adaptive oscillator is configured to reduce a frequency of the clock signal.

7. The system as recited in claim 1, wherein the clock signal is conveyed to a graphics processing circuit.

8. The system as recited in claim 1, wherein the power management circuitry is configured to change the voltage level of the supply voltage of two supply voltages of the adaptive oscillator to change the frequency.

9. A method comprising:
   generating, by an adaptive oscillator, a clock signal for use by at least one component of a computing system, based at least in part on a voltage level of a supply voltage supplied to the adaptive oscillator; and initiating, by power management circuitry, a change in a power performance state of the component by changing the voltage level of the supply voltage supplied to the adaptive oscillator, based at least in part on system parameters of the computing system.

10. The method as recited in claim 9, wherein the adaptive oscillator comprises a regulated supply voltage and a droopy supply voltage, and method comprises changing a frequency of the clock signal to a target frequency by changing a voltage level of the droopy supply voltage.

11. The method as recited in claim 10, wherein the frequency of the clock signal is based at least in part on a difference between the regulated supply voltage and the droopy supply voltage.

12. The method as recited in claim 10, wherein the regulated supply voltage is fixed.

13. The method as recited in claim 10, further comprising changing, by the power management circuitry, the voltage level of the droopy supply voltage supplied to both the adaptive oscillator and processing circuitry configured to execute tasks to a level corresponding to a power performance state of the processing circuitry.

14. The method as recited in claim 10, further comprising the adaptive oscillator reducing a frequency of the clock signal responsive to detecting a reduction in the droopy supply voltage.

15. The method as recited in claim 9, further comprising conveying the clock signal to a graphics processing circuit.

16. The method as recited in claim 9, further comprising changing the voltage level of the supply voltage of two supply voltages of the adaptive oscillator to change the frequency.

17. A system comprising:
 a plurality of computing system components comprising circuitry; and
 a system management circuit;
 wherein to initiate a change in power performance state of a component of the plurality of computing system components, the system management circuit is configured to change a voltage level of a supply voltage supplied to an adaptive oscillator coupled to provide a clock signal to the component based at least in part on system parameters of the plurality of computing system components.

18. The system as recited in claim 17, wherein the adaptive oscillator comprises a regulated supply voltage and a droopy supply voltage, and the system management circuit is configured to change a frequency of the clock signal to a target frequency by changing a voltage level of a droopy supply voltage of the adaptive oscillator from a first voltage level to a second voltage level different than the first voltage level.

19. The system as recited in claim 18, wherein the second voltage level corresponds to a new power performance state of the component.

20. The system as recited in claim 18, wherein the second voltage level corresponds to the target frequency.

* * * * *